(12) United States Patent
MacNeil et al.

(10) Patent No.: US 10,202,011 B2
(45) Date of Patent: Feb. 12, 2019

(54) TWO SHOT INJECTION MOLDED VEHICLE HITCH STEP

(71) Applicant: MACNEIL IP LLC, Bolingbrook, IL (US)

(72) Inventors: David F. MacNeil, Hinsdale, IL (US); Frederick W. Masanek, Jr., Barrington, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 76 days.

(21) Appl. No.: 15/334,544

(22) Filed: Oct. 26, 2016

(65) Prior Publication Data

US 2018/0111431 A1    Apr. 26, 2018

(51) Int. Cl.
| | |
|---|---|
| *B60R 3/00* | (2006.01) |
| *B60D 1/58* | (2006.01) |
| *B29C 45/14* | (2006.01) |
| *B29C 45/16* | (2006.01) |
| *B29K 21/00* | (2006.01) |
| *B29L 9/00* | (2006.01) |
| *B29L 31/30* | (2006.01) |

(52) U.S. Cl.
CPC .......... *B60D 1/58* (2013.01); *B29C 45/14811* (2013.01); *B29C 45/1671* (2013.01); *B60R 3/007* (2013.01); *B29C 2045/1673* (2013.01); *B29K 2021/003* (2013.01); *B29K 2995/0046* (2013.01); *B29K 2995/0082* (2013.01); *B29L 2009/00* (2013.01); *B29L 2031/3005* (2013.01)

(58) Field of Classification Search
CPC .. B60R 3/00; B60R 3/002; B60R 3/04; B60R 3/007; B60R 2011/004; B60R 2011/005
See application file for complete search history.

(56) References Cited

U.S. PATENT DOCUMENTS

| | | |
|---|---|---|
| 5,647,621 A | 7/1997 | McClellan |
| 6,173,979 B1 | 1/2001 | Bernard |
| 6,485,597 B1 * | 11/2002 | Warnecke ........... B29C 47/0026 156/244.24 |

(Continued)

OTHER PUBLICATIONS

SABIC Xenoy X4810 Data Sheet obtained from http://www.matweb.com/search (Year: 2018).*

(Continued)

*Primary Examiner* — James A Shriver, II
*Assistant Examiner* — Vaughn Coolman
(74) *Attorney, Agent, or Firm* — Perkins IP Law Group LLC; Jefferson Perkins

(57) ABSTRACT

A hitch step assembly comprises a first shot component injection molded from a first polymer compound with a high flexural modulus and a second shot component injection molded from a second polymer compound having a relatively low Shore D hardness but high elastic compression. A post and a step body core are molded from the first polymer compound. A shell of the step body is molded from the second polymer compound and is overmolded on the step body core. The shell forms a compression zone that provides some protection against rear impacts. The hitch step assembly exhibits satisfactory resistance to torsion around the hitch receiver axis and deflection, even when a width of the step body exceeds 10.7 inches and the weight of a large man is placed on the top surface of the hitch step near its end.

14 Claims, 8 Drawing Sheets

(56) References Cited

U.S. PATENT DOCUMENTS

| | | | |
|---|---|---|---|
| 6,513,821 B1 * | 2/2003 | Heil | B60R 3/002 182/228.2 |
| 6,896,303 B1 * | 5/2005 | Mohr | B60D 1/06 293/117 |
| 7,527,327 B2 | 5/2009 | Aghssa | |
| 7,967,311 B2 | 6/2011 | Phillips | |
| 8,465,043 B1 | 6/2013 | Buckert | |
| D695,665 S | 12/2013 | Masanek, Jr. | |
| 8,727,364 B2 | 5/2014 | Masanek, Jr. | |
| D714,703 S | 10/2014 | Masanek, Jr. | |
| 8,851,495 B1 | 10/2014 | Masanek, Jr. | B60R 3/00 280/163 |
| D723,443 S * | 3/2015 | Anderson | D12/203 |
| 9,145,035 B2 | 9/2015 | Masanek, Jr. | |
| 9,242,608 B2 | 1/2016 | Masanek, Jr. et al. | |
| D788,669 S * | 6/2017 | Guo | D12/203 |
| 2003/0006576 A1 * | 1/2003 | Lanoue | B60R 3/002 280/163 |
| 2003/0085544 A1 * | 5/2003 | Heil | B60R 3/002 280/163 |
| 2005/0062252 A1 * | 3/2005 | Vincent | B60R 3/002 280/163 |
| 2005/0067741 A1 * | 3/2005 | Chapman | B29C 49/20 264/516 |
| 2006/0145516 A1 * | 7/2006 | Yamamoto | B60R 3/00 296/209 |
| 2006/0249924 A1 * | 11/2006 | Armstrong | B60R 3/002 280/163 |
| 2009/0121449 A1 * | 5/2009 | Kuntze | B60R 3/00 280/163 |
| 2012/0248801 A1 | 10/2012 | Wu | |
| 2014/0001781 A1 * | 1/2014 | Leking | B60R 19/26 293/135 |
| 2014/0054874 A1 * | 2/2014 | Masanek, Jr. | B60D 1/36 280/477 |
| 2015/0108733 A1 * | 4/2015 | Masanek, Jr. | B60R 3/00 280/163 |
| 2015/0292668 A1 * | 10/2015 | Abbasov | B05D 7/146 138/146 |
| 2017/0121525 A1 * | 5/2017 | Luo | C08L 81/04 |
| 2017/0157817 A1 * | 6/2017 | Lee | B29C 45/14 |
| 2017/0259477 A1 * | 9/2017 | Bland | B29C 45/1628 |

OTHER PUBLICATIONS

Dupont Hytrel 4056P Data Sheet obtained from http://www.matweb.com/search (Year: 2018).*

* cited by examiner

TWO SHOT INJECTION MOLDED VEHICLE HITCH STEP

BACKGROUND OF THE INVENTION

Vehicles often have trailer hitch receivers mounted to the frame of the vehicle. These receivers are commonly rearward-facing and have an opening that accepts trailer hitch ball mounts, bike racks, cargo carriers and other hitch mounted accessories. One such accessory, a hitch step, provides a raised platform making the bed of a truck or the roof of a van or SUV more accessible. However, the location of a rearward-facing hitch step means that it is often the point of first impact during a rear end collision.

Because many light trucks, vans and SUV's have wide bodies, it is useful for a hitch step to have a wider, stable platform upon which a user may step at a considerable distance from the hitch axis. A need also exists for a hitch step that absorbs force from the impact of a rear collision along a greater transverse range to better protect more of the vehicle rear bumper.

Prior hitch steps are formed of metal, usually steel in order to withstand the weight of an adult at an off-axis position without unacceptable torsion around the hitch axis or cantilever deformation. Prior hitch steps therefore add considerable weight to the vehicle, and their ability to absorb, rather than transmit, impacts from the rear of the vehicle is limited.

The Applicant has previously developed an all-polymer trailer hitch step, as disclosed in U.S. Pat. No. 9,145,035 B2. While this trailer hitch step provides some protection against rear impacts and affords an area on which a user may step, the width of this hitch step is limited because of the torsional deformation and vertical deflection that would otherwise occur if a heavy load were placed on its transverse end.

SUMMARY OF THE INVENTION

According to one aspect of the invention, a hitch step assembly is made from a first shot component molded from a polymer having a flexural modulus of at least 300,000 psi at 23° C. and a second shot component overmolded onto the first shot component. The second shot component is formed of a thermoplastic elastomer having a bonding affinity to the first shot component and having a Shore D hardness of no more than 45 at 23° C. The assembly has a post formed from the first shot component and adapted to be inserted in a forward direction into a trailer hitch receiver. A step body of the assembly has a core integrally molded with the post, and forming a portion of the first shot component. A shell of the step body is formed of the second shot component and to be overmolded on at least a rear surface of the step body core. A compression zone of the shell extends rearwardly from the rear surface of the core and includes the rear wall of the step body. The compression zone includes plural spaced-apart ribs that extend rearwardly from the rear wall of the step body.

According to another aspect of the invention, a hitch step assembly is made from a first shot component and a second shot component overmolded onto the first shot component. The first shot component is molded from a polymer having a flexural modulus of at least 300,000 psi at 23° C. The second shot component is molded from a thermoplastic elastomer having bonding affinity as herein defined, to the first shot component and having a Shore D hardness of no more than 45 at 23° C. A post of the assembly is formed from the first shot component and is adapted to be inserted in a forward direction into a trailer hitch receiver. A step body of the assembly adjoins the post. The step body has a core integrally molded with the post, and forming a portion of the first shot component. A shell of the step body is formed of the second shot component and is overmolded at least on a rear surface of the step body core. The step body has a width in a transverse direction of more than 10.7 inches as measured from the post axis. When a load of 300 pounds (a weight selected to be more than most prospective users) is applied to the upper surface of the step body at a distance in the transverse direction of 10.7 inches from the post axis, the load will deflect the upper surface of the step body by no more than 1 inch.

The present invention thus provides a polymer trailer hitch step that is wider in a transverse direction than prior polymer hitch steps, but which still is acceptably resistant to torsional force around the post axis and to downward deflection by a large load placed near an end of the step body. The second-shot compression zone of the disclosed hitch step provides a modicum of protection from rear impacts without irreversible damage to either the hitch step or to the vehicle to which it is mounted. The wider aspect of the disclosed hitch step affords increased protection of a rear vehicle bumper from rear impacts and expands the locations where a user can place his or her foot in gaining access to the upper reaches of the vehicle. The second shot top tread surface of a lower durometer material can also provide a higher friction surface under foot when standing on the step.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
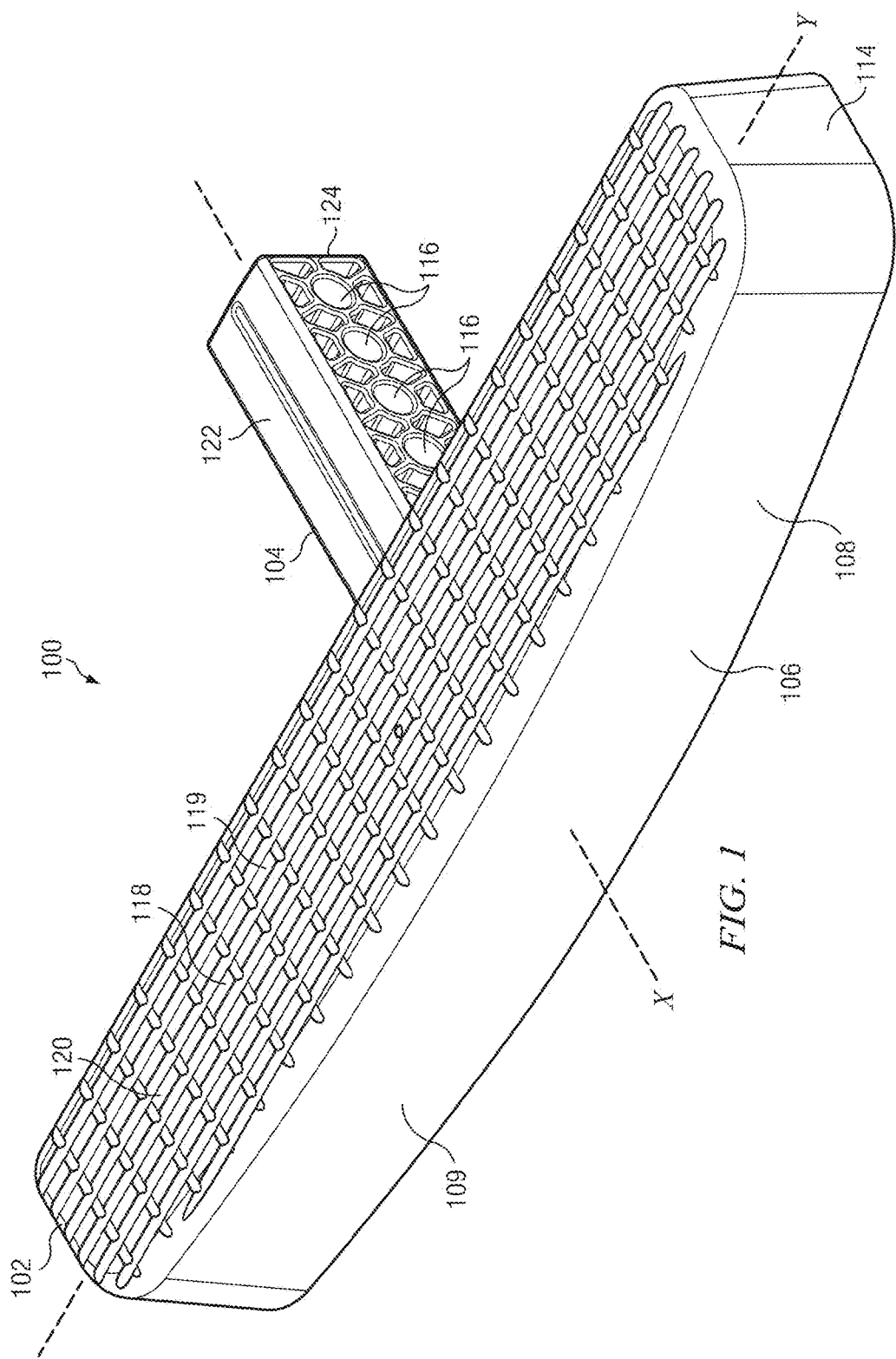
FIG. 1 is an isometric upper rear view of one embodiment of a hitch step assembly according to the invention.

The present invention provides a hitch step for insertion into a hollow receiver type hitch on a vehicle. In the embodiment shown in FIG. 1, a hitch step, generally indicated at 100, includes a step body 102 and a post 104. Hitch step 100 is formed by injection molding in a two-shot process. The post 104 is formed from a first shot component molded from a polymer having a flexural modulus of at least 300,000 psi at 23° C. The polymeric compound generally has a high impact strength, ideally one that is rated as "No-Break" at 23° C. according to the Charpy Unnotched impact test criteria. All properties listed are for an ambient temperatures of 23° C. unless otherwise noted. The material can be a thermoplastic polyester blended with a thermoplastic polycarbonate. In one embodiment the first shot component is a polycarbonate (PC)/polybutylene terephthalate (PBT) polyester blend that has a flexural modulus of 305,000 psi at 23° C. and an impact strength of NB at 23° C. Key properties of the first shot component appear in the following table:

TABLE 1

| Property | Test Method | Value |
| --- | --- | --- |
| Flexural Modulus @23° C. | ISO 178 | 305,000 psi |
| Hardness, Ball Indentation | ISO 2039-1 | 14,500 psi |
| Charpy Unnotched Impact strength: | | |
| −30° C. | ISO 179/IeU | No Break |
| 23° C. | ISO 179/IeU | No Break |
| Charpy Notched Impact strength: | | |
| −30° C. | ISO 179/IeA | 21 ft-lb/in^2 |
| 23° C. | ISO 179/IeA | 29 ft-lb/in^2 |

There are several alternative polymers that can be used for the first shot component, but may exhibit lesser performance attributes than those set forth above. Higher flexural modulus in plastics is typically associated with materials that are more brittle in nature, and conversely materials that exhibit excellent impact resistance and toughness are typically associated with lower flexural modulus materials. The preferred PC/PBT polymer blend maintains both a high flexural modulus and high impact resistance, and is therefore ideally suited for this application where step stability is important as well as resistance to breakage upon low level vehicle impact. Other materials may be chosen, but some of the performance attributes may be diminished. For instance, acrylonitrile butadiene (ABS), polystyrene, PBT polyester, reinforced polypropylene (PP) or even nylon may have sufficiently high flexural moduli, but may fail upon impact or worse yet may fail (break) when a heavy individual is standing on the step. High density polyethylene (HDPE), toughened polypropylene, stiffer grades of Hytrel® (a range of thermoplastic elastomer compounds from DuPont™), or other similar high impact materials may offer good resistance to breakage, but in the present structural design these materials would not offer necessary stability when a heavy individual is standing on the step—the step may bend or torsionally twist at the step/post region and the individual may feel unsafe on the step or worse yet may fall off the step if it flexes or twists sufficiently to cause the person to slip. Temperature extremes must also be taken into consideration. Some materials may either experience flexural strength loss at elevated temperatures (for example, 120° F. in the hot Arizona sun) as would be the case with the HDPE, PP, or Hytrel®—these materials would exhibit even more flex and instability at higher temperatures. At the cold extreme (for example −25° F. in Minnesota), some materials may exhibit cold embrittlement and would have a higher likelihood of breakage upon low level impact, or breakage when an individual stands on the step. The PC/PBT blend material exhibits both high flexural modulus at temperature extremes and excellent cold temperature impact strength and again is ideally suited as the first component material. To a lesser degree, polycarbonate itself may provide properties similar to the PC/PBT blend, but does not exhibit as good a cold temperature impact strength that the PC/PBT exhibits.

The step body 102 has two parts: a core 622 (see FIGS. 6-8) that is integrally molded with the post 104, and a shell 108 overmolded onto the core 622 to form most of a body exterior surface 109. The shell 108 is formed in a second shot part of the injection molding process. The shell 108 extends rearwardly and downwardly over the step body core 622. Preferably the shell 108 forms a rear panel 106 of the step body 102 and also makes up the exterior the side panels or walls 114, 164 (FIG. 2) of the step body 102.

The second shot component is made from a polyester based thermoplastic elastomer having a hardness of about 40 to about 50. The second shot component has a bonding affinity to the first shot component when overmolded. Ideally, the second shot material when overmolded to the first shot component will provide a cohesive bond. In this regard, there is a chemical coupling between the two materials, and the two materials will not delaminate. For the purpose of this application "Bonding affinity" means that when placed under a peel test, the failure mode would be a tearing of one of the materials itself, instead of peeling apart one material from the other. In other words, there will be a cohesive failure not an adhesive failure.

This type of cohesive bond is achieved when the chemistry between first shot material and overmold material have such compatibility as to achieve bonding at the molecular level. In the case of the present design, a copolyester based thermoplastic elastomer (TPE) is chosen for the second component material that has a particularly good chemical bonding affinity to the PC/PBT first component material. The copolyester based TPE in the 40 to 50 Shore D durometer range also exhibits a high degree of elasticity both at lower and higher temperatures. If another first component material were chosen, such as polypropylene, then a different second component material may be chosen (such as styrene ethylene butylene styrene (SEBS) TPE that may again provide cohesive bonding to the first component material. Alternatively, if the second component TPE did not have a bonding affinity to the first component material, a mechanically interlocking design may be used, as seen for example in U.S. Pat. No. 9,248,783 B2, owned by the assignee hereof and incorporated herein by reference.

Key properties an exemplary second shot component appear in Table 2 below.

TABLE 2

| Property | Test Method | Value |
| --- | --- | --- |
| Hardness, Shore D | ISO 868 | ≤45 |
| Flexural Modulus @23° C. | ISO 178 | ≤12,600 psi |
| Tensile Modulus @23° C. | ISO 527-1/-2 | ≤12,300 psi |
| Nominal Strain at Break | ISO 527-1/-2 | 740% |
| Tear Strength Parallel | ISO 34-1 method B/a | 697 lb/in |
| Tear Strength Normal | ISO 34-1 method B/a | 703 lb/in |

A top surface 118 of the step body 102 is formed when the second shot component is overmolded onto the first shot component. The top surface 118 can have grooves or a tread pattern 119. One property of the second shot component is that it can provide enhanced traction and a softer grip of the top surface 118 of the step body 102.

Figure 2:
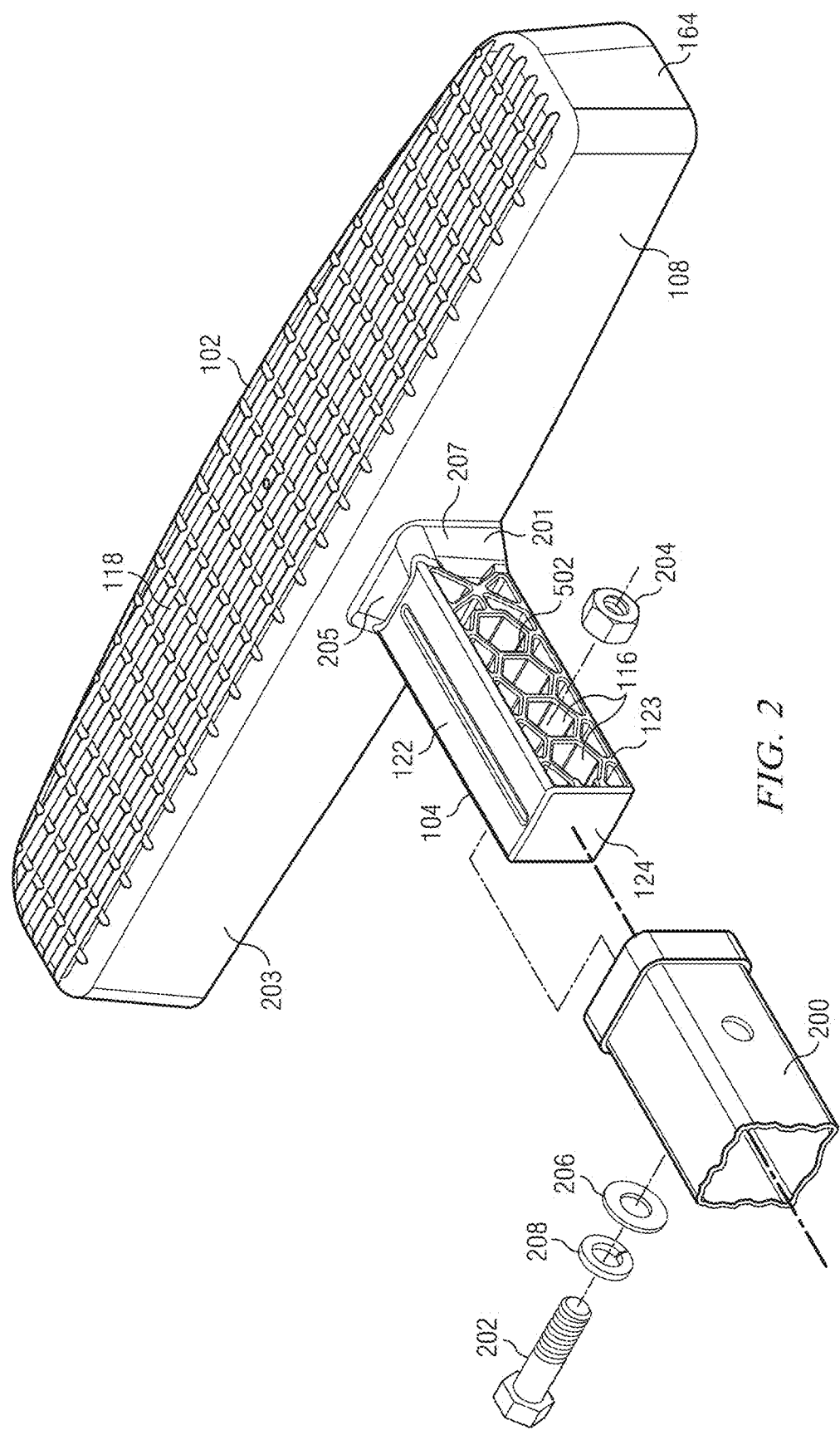
FIG. 2 is an upper left front isometric exploded view of one embodiment of a hitch step assembly, illustrating a portion of a trailer hitch receiver, bolt, washers and nut.
Figure 4:
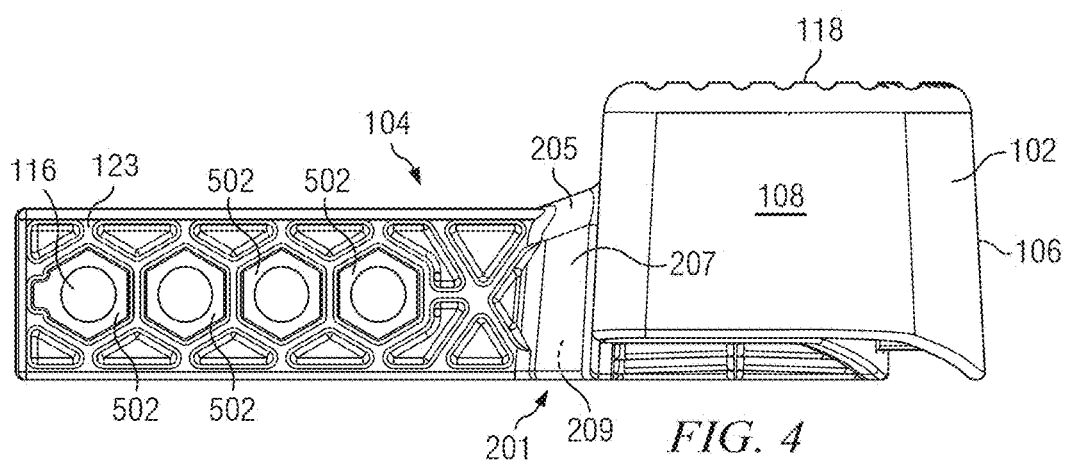
FIG. 4 is a left side view of one embodiment of the invention.
Figure 5:
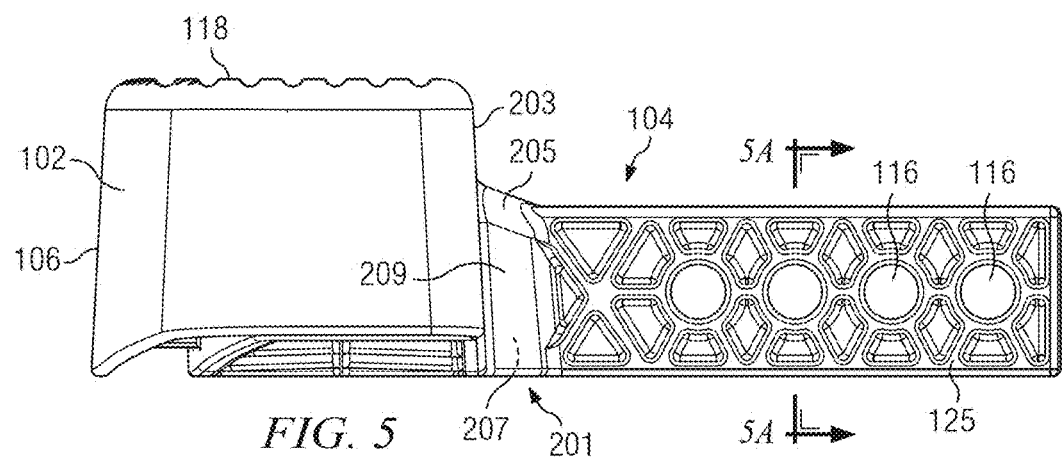
FIG. 5 is a right side view of the embodiment shown in FIG. 4.

In the embodiment shown in FIG. 1, the step body 102 is arranged along a y axis that is transverse, horizontal and perpendicular to the x axis. The post 104 is adapted to be inserted, in a forward direction or longitudinally along the x axis, into a trailer hitch receiver 200 as shown in FIG. 2. In one embodiment of the invention, the step body 102 has a width in they direction that is greater than 10.7 inches from the center of the axis, such as 12 inches. The rear panel 106 is roughly perpendicular to the longitudinal x axis although preferably is slightly rearwardly and downwardly sloped from the top surface 118 (see FIGS. 4 and 5). The rear panel 106 may be flat but is preferably is rearwardly convexly curved relative to a yz plane, z being vertical. It is curved in such a way that in the event of a collision from the rear along the x axis, the center of rear panel 106 would be the first part to be hit. The rear panel 106 may be taller in a z direction at the x axis than it is at a transverse distance from the x axis, and may have a convexly curved or sloped lower margin as shown.

Figure 3:
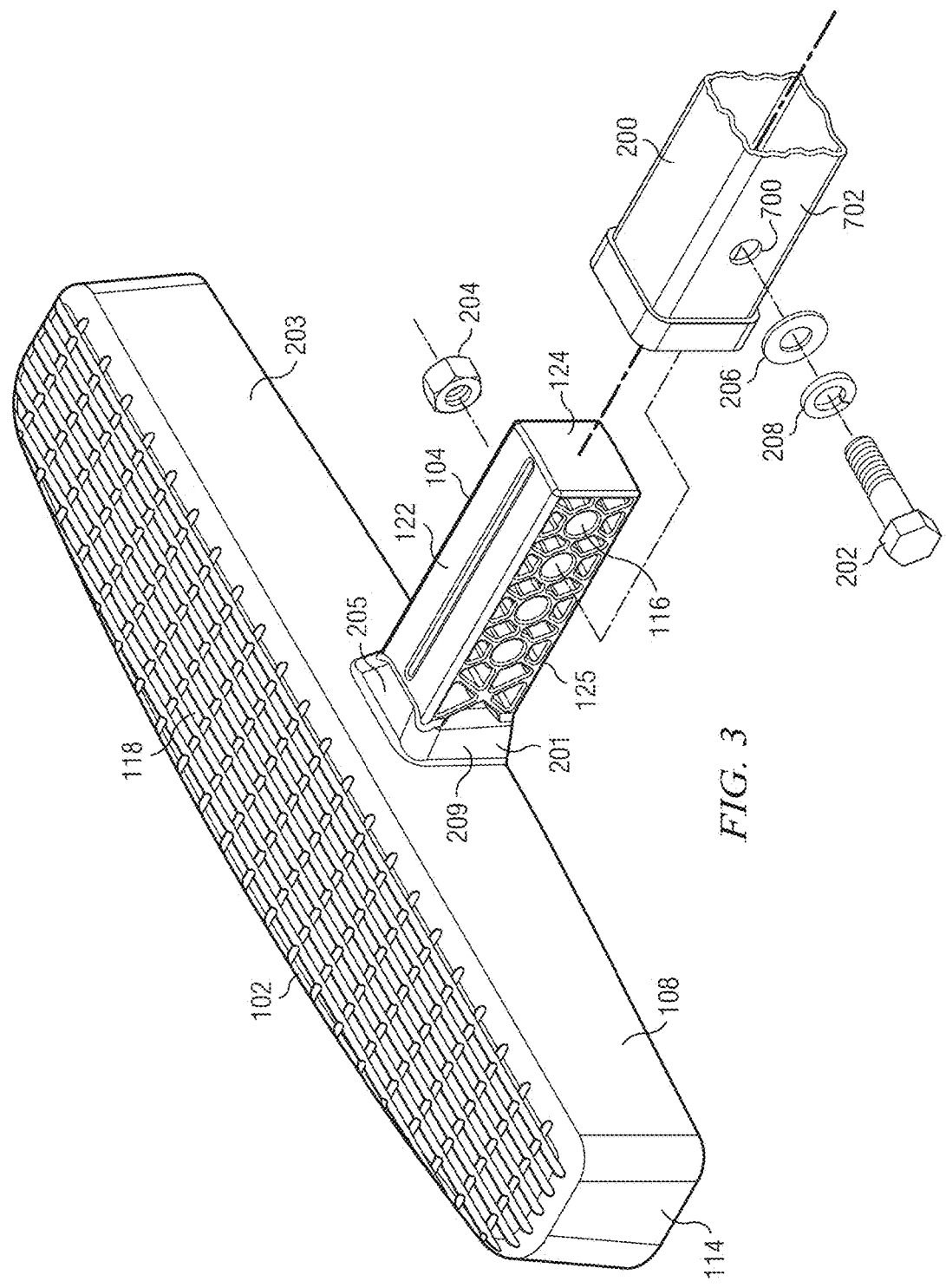
FIG. 3 is an upper right front isometric exploded view of the embodiment shown in FIG. 2.

In the embodiments shown in FIGS. 2-3, the hitch step 100 has a transition area between the post 104 and the step body 102, so as to form a throat region 201. The throat region 201 is chamfered, sloping downward or inward from a front wall 203 of the step body 102 to the top surface or sides 122, 123, 125 of the post 104. The chamfered and radiused design reduces stress concentration at the post/body connection points. The throat region 201 includes a top plate 205 that slopes forwardly and downwardly from rear panel 106 to post top surface 122, a left side wall 207 that slopes forwardly and toward the x axis until its junction with left post side 123, and a right side wall 209 that slopes forwardly and toward the x axis until it joins with right post side 125.

Figure 7:
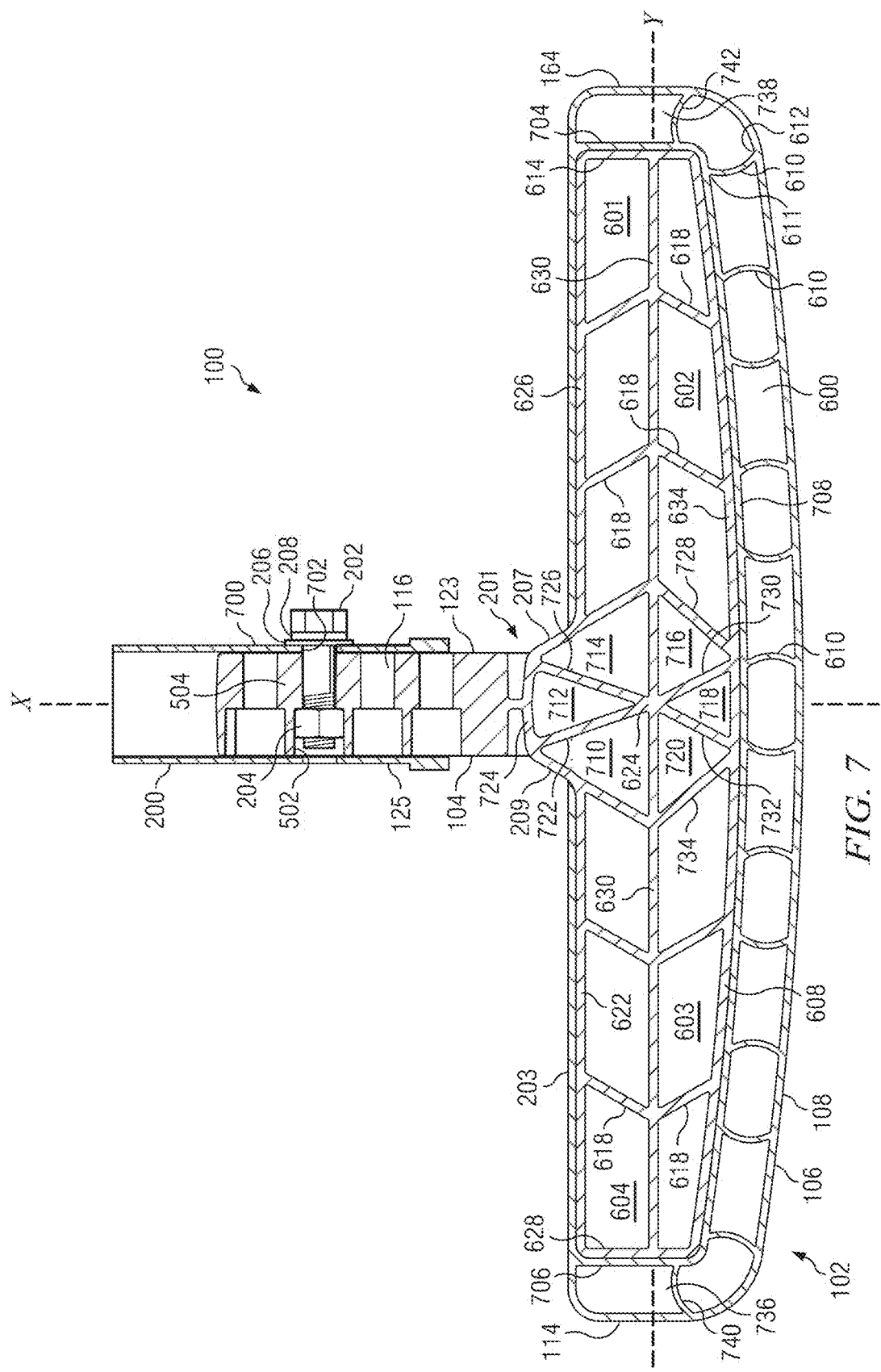
FIG. 7 is a bottom horizontal sectional view taken in the plane of the post and step body of one embodiment of the invention.

Still referring to FIGS. 2-3, and moving toward the front end 124 of the post and away from the throat region 201, four bolt holes 116 are shown. As seen in FIG. 2, the left ends 502 of the bolt holes 116 take the form of multi-sided prisms, one of which will be selected to receive a nut 204. In the illustrated embodiment the nut 204 is a hex nut and the prisms are hexagonal. As shown in FIG. 7, The bolt 202 is inserted into a lock washer 208, a flat washer 206, a hole 700 in a left side 702 of the square-shaped hitch receiver 200 and a selected one of the four bolt holes 116, and is then threaded into a hex nut 204 that had been inserted into a left end 502 of the selected bolt hole 116.

Figure 5A:
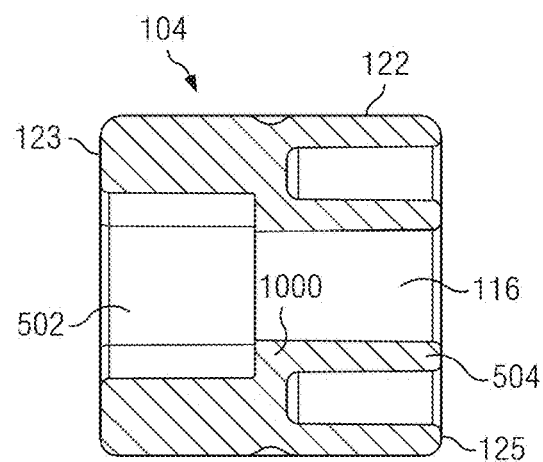
FIG. 5A is a sectional view taken substantially along line 5A-5A of FIG. 5.

FIG. 5A is a cross sectional view of post 104, showing one embodiment of the nut receiver 502 and associated bolt hole 116. The hexagonal openings on left side 123 of the post 104 are opposite circular openings on the right side 125 of the post 104 to allow bolt 202 to pass through to nut 204. After tightening, and as seen in FIG. 7, the nut 204 is compressed against a solid cylindrical structure 504 and against the wall 702 of the hitch receiver 200. The hitch receiver hole 700 and bolt 202 are essentially the only attachment point holding the hitch step 100 to the trailer hitch receiver 200. Generally the nut and bolt can be any nut and bolt that is fairly substantial in size. Although not limited to any particular size, one embodiment uses a ⅝" bolt thread, ¹⁵⁄₁₆" across the flats of the nut. The bolt can be tightened substantially due to the high compressive strength of the PC/PBT. The use of the PC/PBT material allows such an attachment as the material is not as subject to plastic deformation as softer more compressible materials would be. The outer right side of the post 104 is drawn firmly against the inner right side wall 702 of the hitch receiver 200. The tightness of installation mitigates any looseness that would otherwise be experienced for if using for example, a through pin attachment that requires some clearances for assembly of the pin. The looseness, particularly in a 24" wide step, could be perceived as an unstable state by someone standing on the step, so this attachment method is more appropriate for this design given the width of the step In the embodiments shown in FIGS. 6-8, the underside of step body 102 and throat region 201 are substantially hollow so that that the body 102 and throat region 201 may be fabricated through injection molding without significant departures from a nominal wall thickness. It can be seen in FIG. 6 that the post 104 is integrally formed in the same injection molding shot as the body core 622. The post 104 is formed along the x axis and is square in axial cross-section as seen in FIGS. 2, 3 and 5A. In one embodiment, the post 104 may be about two inches wide and tall, to fit a popular size of trailer hitch receiver 200. The right transitional wall 209 of throat region 201 is formed at an angle to the x and y directions and extends from the right side 125 of post 104 to intersect and extend rearwardly beyond the front wall 626 of the core 622 and to terminate at a transversely oriented center wall 630. A left transitional wall 207 is formed at an angle to the x and y directions and extends from the left side 123 of post 104 to intersect and extend rearwardly beyond the front wall 626 of the core 622, and to terminate at the core center wall 630. The core 622 is bounded by and includes the core front wall 626, a left side core wall 614, a right side core wall 628 and a rear core wall 634. In the illustrated embodiment, the external surfaces of core walls 626, 614, 628 and 634 are respectively overmolded with walls 203, 704, 706 and 708 of the second-shot shell 108, covering all of the core 622 except for its bottom and the location where throat region 201 and post 104 extend forwardly from the core 622.

As seen in FIG. 7, the core 622 has a left front quadrant 601, a left rear quadrant 602, a right rear quadrant 603, and a right front quadrant 604. The core center wall 630 has a midpoint or core center 624, runs along they axis of the step body 102, is aligned to the vertical or z axis, and separates the front quadrants 601, 604 from the rear quadrants 602, 603. Each quadrant 601-604 has at least one but preferably a plurality of spaced-apart slanted plates 618, each of which is aligned to the vertical or z direction. The slanted plates 618 in each quadrant 601, 602, 603, 604 are parallel to each other, each quadrant being a mirror image of an adjacent quadrant.

Figure 6:
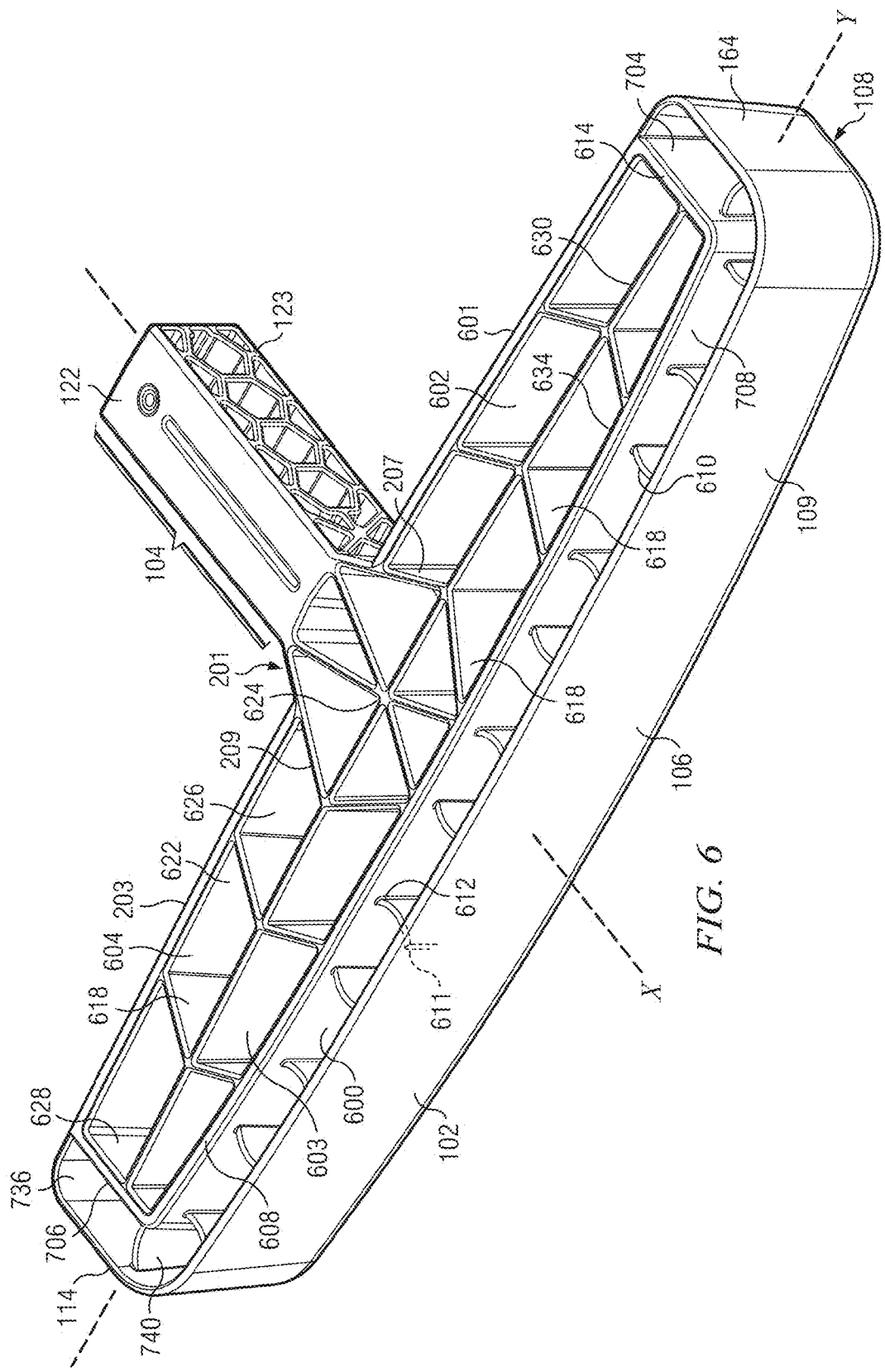
FIG. 6 is a bottom left isometric view of one embodiment of the invention.
Figure 8:
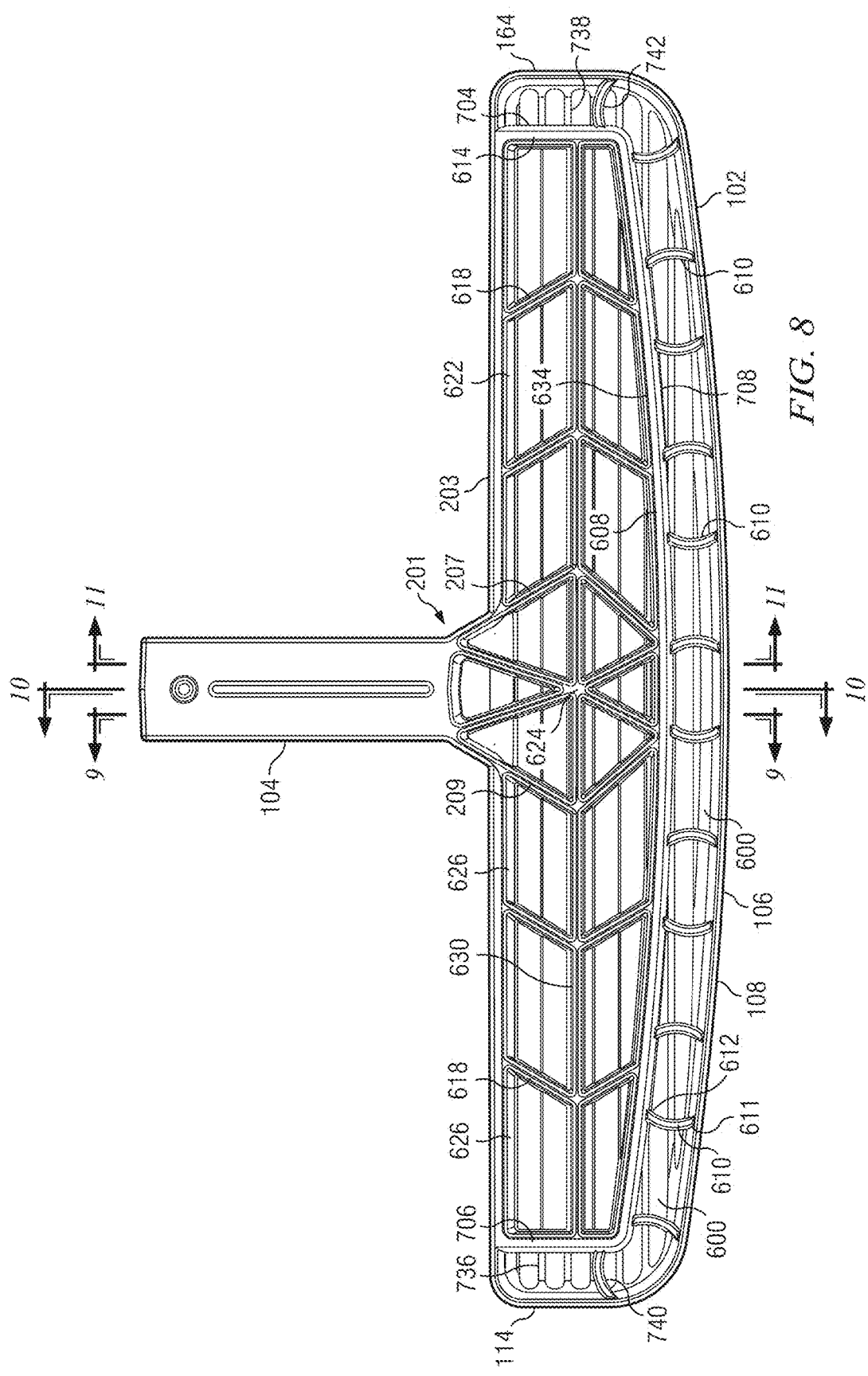
FIG. 8 is a bottom view of one embodiment of the invention.

In the embodiment show in FIGS. 6-8, plates 618 and center wall 630 form a herringbone pattern. Each of the slanted plates 618 has a medial or central end, joined to center wall 630, that is displaced in a transverse direction from center 624 more than its opposed, lateral end. The central ends further each terminate at a point on center wall 630 that is shared by a central end of an adjacent slanted plate 618. This herringbone pattern may allow some degree of bending in the xy plane in the event of an offset impact in the rear, but nevertheless provides bending strength and rigidity in the y direction.

As shown in FIGS. 6-8, center 624 is disposed at the intersection of the x and y axes of the device. Certain walls of the core 622 form a plurality of triangular prisms 710-720 each having one apex at center 624, and each triangular prism 710-720 has two plates or walls in common with the neighboring triangular prisms 710-720.

Right front prism 710 is constituted by center wall 630, throat region wall 209 and a wall 722 that extends from center 624 about to the junction of wall 209 and post side 125. Center front prism 712 is constituted by wall 722, a front wall 724 of the throat region 201, and a wall 726 that extends from center 624 about to the junction of wall 207 and post side 123. Left front prism 714 is constituted by wall 726, throat region wall 207 and step body center wall 630. Left rear prism 716 is constituted by a wall 728 that extends from a junction of wall 207 and wall 630 rearwardly and transversely inwardly to rear core wall 634. Center rear prism 718 is constituted by a wall 730 that extends from center 624 leftwardly and rearwardly to rear core wall 634, rear core wall 634, and a wall 732 that extends from center 624 rearwardly and rightwardly to the rear core wall 634. Right rear prism 720 is constituted by wall 732, a wall 734 that extends from the junction of throat region wall 209 and center wall 630 to a junction of wall 732 and rear core wall 634, and core center wall 630. Prisms 710-720 extend into the throat region 201 and provide more local stiffness and torsional strength in the throat region 201.

The second shot is overmolded onto a top wall 900 (see FIGS. 9-11) of the core 622 and preferably also is overmolded onto the side walls 614, 628 and rear wall 634 of the core 622. Second shot walls 704, 706 and 708 form an inner boundary of a compression zone 600. Compression zone 600 extends rearwardly from wall 708 to include rear wall 106 of the step body 102. Compression zone 600 further and preferably extends rightward (to the left in the bottom views of FIGS. 6-8) from wall 706 to outer wall 114, and leftward (to the right in FIGS. 6-8) from wall 704 to include outer wall 164. The assembly can withstand impact from a 4,000 pound vehicle moving at a speed of no more than five miles per hour.

Preferably compression zone 600 contains several spaced-apart ribs 610. Each rib 610 has a first rib end 611 is attached to the outer wall 106 of the step body 102, and a second rib end 612 that is closer to the core rear surface 608. In one embodiment each rib 610 is attached at its second rib end 612 to inner compression zone wall 708. It is preferable that the ribs 610 be arcuate between their ends 611, 612. This arcuate cross section will promote collapsing in the event of a rear impact, but the resilient nature of the thermoplastic elastomer making up ribs 610 will allow the compression zone 600 to spring back to its original shape after sustaining a modest impact. This adds additional protection the vehicle in the event of a rear collision.

In the illustrated embodiment, the compression zone 600 has a right side region 736 that includes walls 706 and 114, and a left side region 738 that includes walls 704 and 164. Right side region 736 includes at least one arcuate rib 740 that extends between wall 706 and wall 114. Left side region 738 includes at least one arcuate rib 742 that extends between wall 704 and wall 164. Ribs 740 and 742 give a measure of elastic compression in response to impacts having vectors at a considerable angle to the x axis.

The shell 108 also overmolds the core front wall 626 with a front wall 203. In the event of a collision that is so severe that the step body 102 deflects forwardly to impact a rear bumper of the vehicle (not shown), the elastomeric front wall 203 will provide some cushioning and some protection against marring the bumper surface, which in recent vehicles tends to be flexible painted plastic.

As seen in FIGS. 8-11, core wall 900 is of a substantially uniform thickness to aid in injection molding the part.

Figure 9:
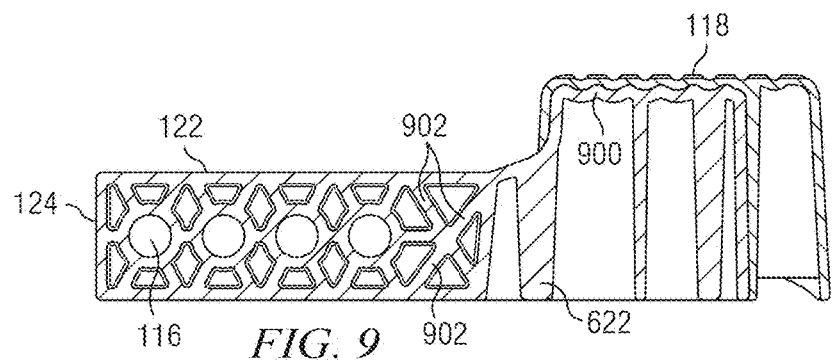
FIG. 9 is a sectional view taken substantially along line 9-9 of FIG. 8.
Figure 10:
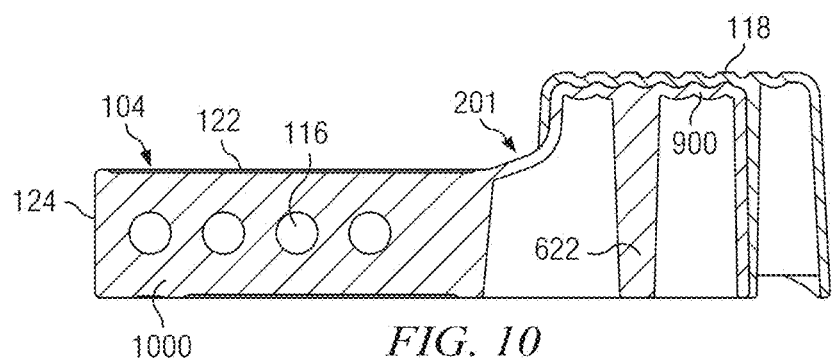
FIG. 10 is a sectional view taken substantially along line 10-10 of FIG. 8.
Figure 11:
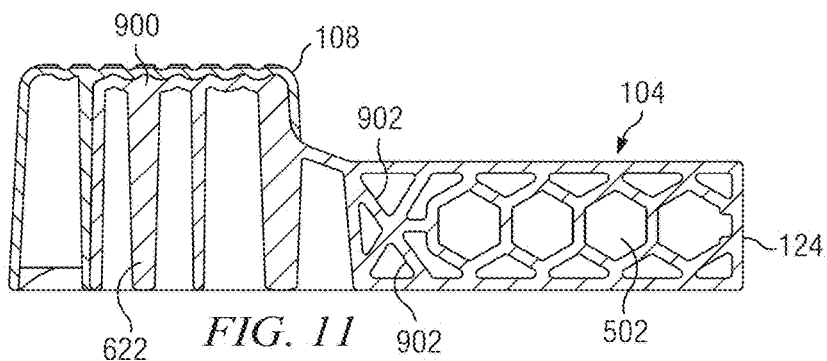
FIG. 11 is a sectional view taken substantially along line 11-11 of FIG. 8.

As shown in FIG. 10, the post 104 has a central vertical plate 1000 aligned on the x axis to extend downward from top wall 122 and extending for the entire length of post 104. Plate 1000 forms the inner boundary of each nut receiver 502. The sections shown in FIGS. 9 and 11 depict inclined reinforcing plates 902 that intersect each other at the x axis, are disposed at an angle to the z axis, and provide additional stiffness.

Figure 12:
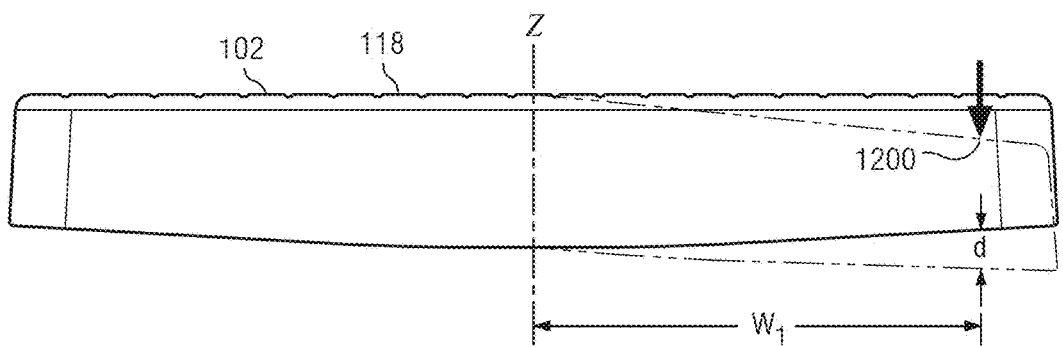
FIG. 12 is a rear view, with a dotted line illustrating the position of the step body under a 300 pound load placed at a distance $w_1$ on the top surface of one embodiment of the invention.

The two-shot construction of hitch step 100 permits it to enjoy the advantages of a relatively stiff step body core 102 and a shell 108 that springs back from a modest amount of impact force and exhibits a good coefficient of friction. In one embodiment, if a load representing a relatively large user is placed at point 1200 as shown in FIG. 12, where point 1200 is $w_1$ from the z axis, the top surface 118 of the step body 102 will only deflect by a deflection d. In one embodiment, in which a load of 300 pounds is placed on surface 118 at 10.7 inches from the z axis, deflection d will be no more than about one inch. A load of 300 pounds was selected to emulate the weight of a large man. In this embodiment, the entire width of the step body in a y direction is about 12 inches, providing a greater amount of coverage to a vehicle's rear bumper and affording an extended range of locations where a user may place his or her foot.

In summary, an all-polymer trailer hitch step has been provided in which a first shot component makes up a core of the step body and the post, and a second-shot component makes up a step body shell. The first shot component is sufficiently stiff that a transverse width of the step body may be outwardly extended beyond dimensions previously unattained by nonmetallic hitch step structures. At the same time, the second-shot component provides an elastically deformable compression zone that can absorb a modest amount of rear impacts without failure, and protects an extended portion of a vehicle's rear bumper.

While illustrated embodiments of the present invention have been described and illustrated in the appended drawings, the present invention is not limited thereto but only by the scope and spirit of the appended claims.

We claim:
1. A hitch step assembly comprising:
   a first shot component molded from polymer having a flexural modulus of at least 300,000 psi at 23° C. and an impact strength of No-Break at 23° C.;
   a second shot component overmolded onto the first shot component, the second shot component formed from a thermoplastic elastomer having a bonding affinity to the first shot component and having a shore D hardness of approximately 45 at 23° C.;
   a post formed from the first shot component and adapted to be inserted in a forward direction into a trailer hitch receiver; and
   a step body joined to the post and comprising:
   a core integrally molded with the post, the core forming a portion of the first shot component and having a rear surface;
   a shell of the step body formed of the second shot component, wherein the shell of the step body is overmolded at least onto the rear surface of the core, a rear wall of the step body formed from the second shot component to be spaced from the rear surface of the core, a compression zone of the shell formed to extend rearwardly from the rear surface of the core and including the rear wall of the step body, the compression zone including a plurality of spaced-apart ribs formed to extend forwardly from the rear wall of the step body.

2. The hitch step assembly of claim 1, wherein the core has a left side extending forwardly from the rear surface of the core and a right side extending forwardly from the rear surface of the core, the shell having a left wall spaced from the left side of the core and a right wall spaced from the right side of the core, the compression zone of the shell extending from the left surface of the core to include the left wall of the shell, the compression zone of the shell further extending from the right surface of the core to include the right wall of the shell.

3. The hitch step assembly of claim 1, wherein the compression zone is elastically deformable and able to return to its original state in response to a temporarily applied external force of less than a predetermined amount.

4. The hitch step assembly of claim 1, wherein the plurality of ribs in the compression zone includes ribs having first ends joined to the rear wall of the step body and respective second ends disposed forwardly of the rear wall of the step body, each last said rib being arcuate between its first end and its second end.

5. The hitch step assembly of claim 1, wherein the core of the step body has a front wall, a front wall of the shell of the step body overmolded onto the front wall of the core to protect a bumper of a vehicle mounting the trailer hitch receiver from impact by the core.

6. The hitch step assembly of claim 1, wherein the post is oriented in an x direction, the body is elongated in a y direction at right angles to the x direction, and a z direction is orthogonal to the x and y directions, the core being substantially hollow, the core having a rear wall and a front wall, a center wall disposed between the rear wall and the front wall and oriented in a yz plane, a top panel of the core joined to the rear, center and front walls, the top panel oriented in an xy plane and being substantially uniformly thick in the z direction.

7. The hitch step assembly of claim 1, wherein the post is formed on an x axis, the post further comprising at least one bolt hole having a bolt hole axis orthogonal to the x axis, one side of the post having a prismatically shaped nut receiver in alignment with the bolt hole axis, the nut receiver having a bottom, a solid cylinder surrounding the bolt hole and extending from the bottom of the nut receiver to a second side of the post opposite the first side, such that when a bolt is threaded through the bolt hole and is threaded into a nut contained in the nut receiver, the nut is compressed against the solid cylinder.

8. A hitch step assembly comprising:
    a first shot component molded from polymer having a flexural modulus of at least 300,000 psi at 23° C. and an impact strength of No-Break at 23° C.;
    a second shot component overmolded onto the first shot component, the second shot component formed from a thermoplastic elastomer having a bonding affinity to the first shot component and having a shore D hardness of approximately 45 at 23° C.;
    a post formed from the first shot component and adapted to be inserted in a forward direction into a trailer hitch receiver along an axis; and
    a step body adjoining the post and having an upper surface, the step body comprising:
    a core integrally molded with the post, forming a portion of the first shot component and having a rear surface;
    a shell of the step body formed of the second shot component, wherein the shell of the step body is overmolded at least onto the rear surface of the core, and wherein the step body has a width greater than 10.7 inches as measured in a horizontal direction at right angles to the axis, so that when a load of 300 pounds applied to the upper surface of the step body at a distance in the horizontal direction of 10.7 inches from the center of the axis, the load deflects the upper surface of the step body in a downward direction by no more than 1 inch,
    wherein the post is formed on an x axis and the step body is formed on a y axis at right angles to the x axis, the core having a center located at the intersection of the x and y axes, the core being substantially hollow and divided into four quadrants in the xy plane around the center, each quadrant having a plurality of slanted plates aligned to the z direction but at an angle to the x and y directions, the slanted plates in each quadrant being parallel to each other, the slanted plates in each quadrant being mirror images of the slanted plates in any adjacent quadrant.

9. The hitch step assembly of claim 8, wherein the rear surface of the core is a rear surface of a rear wall of the core that is aligned to the y axis, the post being square in axial cross-section and having a left side and a right side, the post joined to the core of the step body by a throat region formed of the first shot component, a right transitional wall of the throat region formed at an angle to the x and y axes and extending from the right side of the post to the rear wall of the core, a left transitional wall formed of the throat region formed at an angle to the x and y axes and extending from the left side of the post to the rear wall of the core.

10. The hitch step assembly of claim 9, wherein the core has a center wall aligned to a z direction that is orthogonal to the x axis and they axis, the center wall of the core spaced rearwardly from the rear wall of the core, the right transitional wall extending beyond the rear wall of the core to the center wall of the core, the left transitional wall extending beyond the rear wall of the core to the center wall of the core.

11. The hitch step assembly of claim 8, wherein the core is substantially hollow and includes a plurality of plates disposed in parallel to a z direction orthogonal to the x axis, ones of the plates forming a plurality of triangular prisms each having an apex on the x axis, each triangular prism having two plates in common with neighboring triangular prisms.

12. The hitch step assembly of claim 11, wherein the core of the step body is formed on a y axis orthogonal to the x axis and the z direction, one apex of each of the prisms located at the intersection of the x and y axes.

13. The hitch step assembly of claim 8 wherein the core has a front wall substantially oriented in a yz plane, a rear wall of the core spaced from the front wall of the core, a center wall of the core substantially oriented in a yz plane and spaced between the front wall of the core and the rear wall of the core, the slanted plates each having a first end and a second end opposed to the first end, the slanted plates including:
    left rear slanted plates spaced apart from each other in planes parallel to the z axis and at an angle to both the x and y axes, the first ends of the left rear slanted plates connected to the center wall of the core and the second ends of left rear slanted plates connected to the rear wall of the core, the first ends of the left rear slanted plates being located farther from the x axis than the second ends of the left rear slanted plates;
    left front slanted plates spaced apart from each other in planes parallel to the z axis and at an angle to both the x and y axes, the first ends of the left front slanted plates connected to the center wall of the core and the second ends of the left front slanted plates connected to the front wall of the core, the first ends of the left front slanted plates being located farther from the x axis than the second ends of the left front slanted plates;
    right rear slanted plates spaced apart from each other in planes parallel to the z axis and at an angle to both the x and y axes, the first ends of the right rear slanted plates connected to the center wall of the core and the second ends of the right rear slanted plates connected to the rear wall of the core, the first ends of the right rear slanted plates being located farther from the x axis than the second ends of the right rear slanted plates; and right front slanted plates spaced apart from each other in planes parallel to the z axis and at an angle to both the x and y axes, the first ends of the right front slanted plates connected to the center wall of the core and the second ends of right front slanted plates connected to the front wall of the core, the first ends of the right front slanted plates being located farther from the x axis than the second ends of the right front slanted plates, whereby the slanted plates and the center wall of the core form a herringbone pattern.

14. The hitch step assembly of claim 8 wherein the post and step body consist essentially of the first and second shot components.

* * * * *